V. BREUER AND P. LESCHNIK.
AUTOMOBILE BUMPER.
APPLICATION FILED OCT. 3, 1919.

1,325,924.

Patented Dec. 23, 1919.

INVENTORS
V. Breuer & P. Leschnik
BY
Sigmund Herzog
ATTORNEY

UNITED STATES PATENT OFFICE.

VLADIMIR BREUER AND PHILIP LESCHNIK, OF NEW YORK, N. Y.

AUTOMOBILE-BUMPER.

1,325,924.  Specification of Letters Patent.  Patented Dec. 23, 1919.

Application filed October 8, 1919. Serial No. 329,407.

*To all whom it may concern:*

Be it known that we, VLADIMIR BREUER and PHILIP LESCHNIK, citizens of the United States, and residents of New York, in the county of Queens and New York, respectively, and State of New York, have invented certain new and useful Improvements in Automobile-Bumpers, of which the following is a specification.

The present invention relates to improvements in bumpers for automobiles, and has for its main object to provide a device of this type which is simple in construction, efficient in operation, durable in use and which may be readily repaired in case it is broken or otherwise injured.

Another object of the invention is to produce a bumper of the character described which may be readily mounted on an automobile and is adjustable in width, thus being adapted for use with different makes and sizes of motor vehicles.

A further object of the invention is to produce a bumper of the type mentioned which is adapted for manufacture on a commercial scale, or in other words one which is not so difficult to make as to be beyond the reasonable cost of such a contrivance.

With these and other objects in view, which will more fully appear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claim without departing from the spirit or sacrificing any of the advantages of the invention.

One of the many possible embodiments of the invention is illustrated in the accompanying drawings, in which:—

Figure 1:
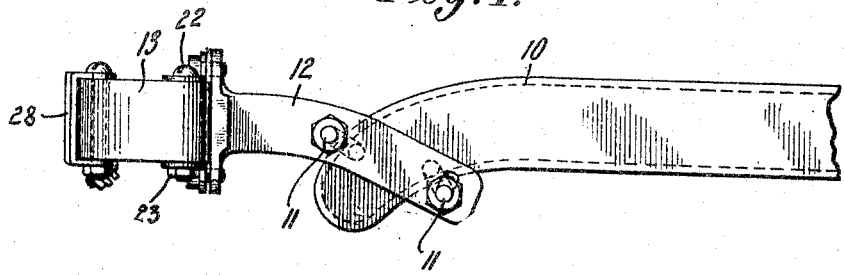
Figure 3:
Figure 2:
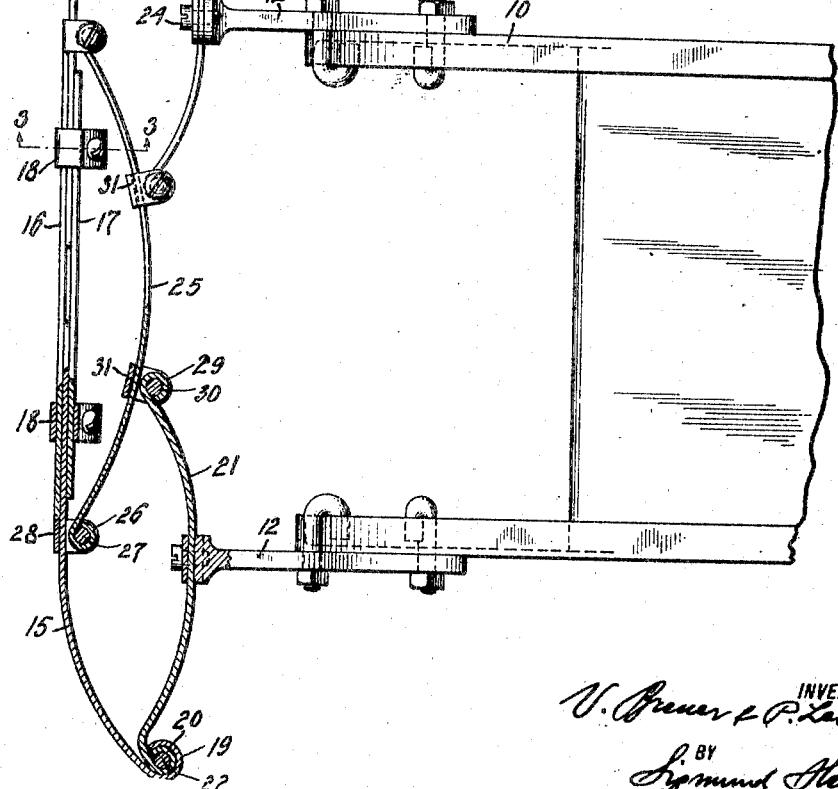

Figure 1 is a side elevation of the front portion of an automobile frame, with a bumper constructed in accordance with the present invention in position thereon; Fig. 2 is a top plan view thereof, partly in section; and Fig. 3 is a section taken on line 3—3 of Fig. 2.

In the drawings the numeral 10 indicates the front end portions of the longitudinal frame members of a motor vehicle, to which are attached in any suitable manner, for instance by bolts 11, forwardly projecting substantially horizontally extending supports 12, carrying the bumper. The bumper comprises a transversely extending spring bar 13, made preferably of two sections, denoted by the numerals 14 and 15. The inner ends of these sections are disposed between flat strips 16 and 17, one abutting against the front faces of the said bar sections and the other one against the rear faces thereof, as clearly shown in Fig. 2 of the drawings. Clips 18 serve to unite the two sections of the spring bar 13, said clips embracing, as it were, the said bar sections and the strips 16 and 17. The outer ends of the bar sections 14 and 15 are curved, project beyond the sides of the automobile frame and are formed into tubular terminals 19, within which are disposed the outer tubular heads 20 of two semi-elliptic springs 21. To prevent a disengagement of these two springs from the two ends of the bar 13, there are provided screw-bolts 22, extending through the heads 20 of the springs 21, nuts 23, meshing with threads on the said bolts, holding the latter in position. The springs 21 are disposed in rear of the bar 13 and are fixedly secured at or adjacent their middle portions, for instance by screws 24, to the supports 12. A central, reinforcing semi-elliptic spring 25 is mounted upon the spring bar 13, its heads 26 engaging pivot bolts 27, the latter being carried by slides 28 on the two sections of the spring bar 13. The inner heads 29 of the springs 21 engage pivot bolts 30 on slides 31. These slides are mounted upon the reinforcing spring 25.

The bumper thus constructed may be made up in quantity and carried in stock. Inasmuch as the spring bar 13 is made of two sections and the ends of the reinforcing spring 25 are freely movable thereon, and since the inner heads of the springs 21 are slidably arranged on the said reinforcing spring, the bumper is adapted for use on any make, style, or size of automobile. This is a great advantage both to the manufacturer and user, as well as to the dealer.

The bumper is made preferably of spring steel throughout and yields thus readily to forces exerted upon it in any direction. In case the bumper strikes an object, it yields freely thereto, a combination spring action being obtained which, while rendering the bumper resilient in operation, imparts to it great strength, the spring 25 reinforcing the spring bar 13, and the springs 21 preventing a deformation of the said reinforcing spring. Danger of injuring the vehicle is thus reduced to a minimum, so is also injury to persons, struck by the vehicle in motion, obviated to a large extent.

What we claim is:—

A bumper for motor vehicles comprising two supports adapted to be attached to the front end portion of the vehicle frame, two semi-elliptic springs secured adjacent their middle portions to said supports, said springs extending forwardly and their outer heads projecting sideward beyond the vehicle frame, a spring bar disposed in front of said semi-elliptic springs connected at its ends to the outer heads of said springs, a central reinforcing semi-elliptic spring in rear of said spring bar having its heads slidably disposed on said bar, and two slides on said reinforcing spring connected with the inner heads of said first-mentioned two semi-elliptic springs.

Signed at New York, in the county of New York and State of New York, this 8th day of September, 1919.

VLADIMIR BREUER.
PHILIP LESCHNIK.